(12) United States Patent
Kitamura et al.

(10) Patent No.: US 10,063,321 B2
(45) Date of Patent: Aug. 28, 2018

(54) FRAMER, OPTICAL TRANSMISSION DEVICE, AND FRAMING METHOD

(71) Applicant: NIPPON TELEGRAPH AND TELEPHONE CORPORATION, Tokyo (JP)

(72) Inventors: Kei Kitamura, Tokyo (JP); Takashi Kotanigawa, Tokyo (JP); Takafumi Hamano, Tokyo (JP); Kaoru Arai, Tokyo (JP); Masahiro Yokota, Tokyo (JP); Hideki Maeda, Tokyo (JP); Yoshiaki Yamada, Yokosuka (JP); Takuya Ohara, Yokosuka (JP); Kengo Shintaku, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days.

(21) Appl. No.: 15/528,629

(22) PCT Filed: Nov. 27, 2015

(86) PCT No.: PCT/JP2015/083379
§ 371 (c)(1),
(2) Date: May 22, 2017

(87) PCT Pub. No.: WO2016/084934
PCT Pub. Date: Jun. 2, 2016

(65) Prior Publication Data
US 2017/0257169 A1    Sep. 7, 2017

(30) Foreign Application Priority Data

Nov. 28, 2014  (JP) ................................. 2014-241493

(51) Int. Cl.
*H04B 10/50* (2013.01)
*H04J 14/08* (2006.01)
(Continued)

(52) U.S. Cl.
CPC .............. *H04B 10/50* (2013.01); *H04J 14/08* (2013.01)

(58) Field of Classification Search
CPC ...... H04B 10/50; H04B 10/40; H04B 10/516; H04J 14/08
See application file for complete search history.

(56) References Cited

U.S. PATENT DOCUMENTS

2010/0142947 A1   6/2010  Shin et al.
2012/0189304 A1   7/2012  Lin et al.
(Continued)

FOREIGN PATENT DOCUMENTS

CN   103533464 A   1/2014
EP      2819362 A1  12/2014
(Continued)

OTHER PUBLICATIONS

"Interfaces for the optical transport network", ITU-T G.709/Y.1331, Feb. 2012.
(Continued)

*Primary Examiner* — Darren E Wolf
(74) *Attorney, Agent, or Firm* — Harness, Dickey & Pierce, P.L.C.

(57) ABSTRACT

There is provided a tray which is connected to a plurality of transmitters that multicarrier-transmit a plurality of parallel signals by optical subcarriers. The framer selects time slots to be allocated to a path to be accommodated such that the number of optical subcarriers corresponding to the time slots satisfies a predetermined condition on the basis of empty time slots which are specified by path accommodation information indicating a correspondence between paths allocated to a client signal and time slots in a signal frame and the optical subcarriers corresponding to the empty time slots indicated by time slot information indicating a correspon-
(Continued)

dence between the time slots and the optical subcarriers, and sets the selected time slot in the path accommodation information. The framer sets a client signal to the time slots on the basis of the path accommodation information.

5 Claims, 14 Drawing Sheets

(51) Int. Cl.
    *H04B 10/40*     (2013.01)
    *H04B 10/516*     (2013.01)

(56) References Cited

U.S. PATENT DOCUMENTS

2012/0251109 A1   10/2012   Mori
2013/0216217 A1    8/2013   Sharma et al.

FOREIGN PATENT DOCUMENTS

| JP | 2010-136380 A | 6/2010 |
| JP | 2012-004839 A | 1/2012 |
| JP | 2012-119999 A | 6/2012 |
| JP | 2012-209877 A | 10/2012 |
| WO | WO-2013/125621 A1 | 8/2013 |

OTHER PUBLICATIONS

Takuya Ohara, "OTN Interface Technologies and Standardization Trend", Proceedings of the 2014 IEICE General Conference 2, BI-5-1, SS-47 - SS-48, Mar. 2014, with partial translation thereof.
International Search Report for PCT/JP2015/083379, ISA/JP, Tokyo, dated Jan. 26, 2016, with English translation thereof.
Bo Wen et al: "Routing, wavelength and time-slot-assignment algorithms for wavelength-routed optical WDM/TDM networks", Journal of Lightwave Technology, vol. 23, No. 9, Sep. 1, 2005 (Sep. 1, 2005), pp. 2598-2609.
Extended European Search Report for parallel application EP 15862960.0, EP, Munich, dated Jun. 21, 2018, in English.

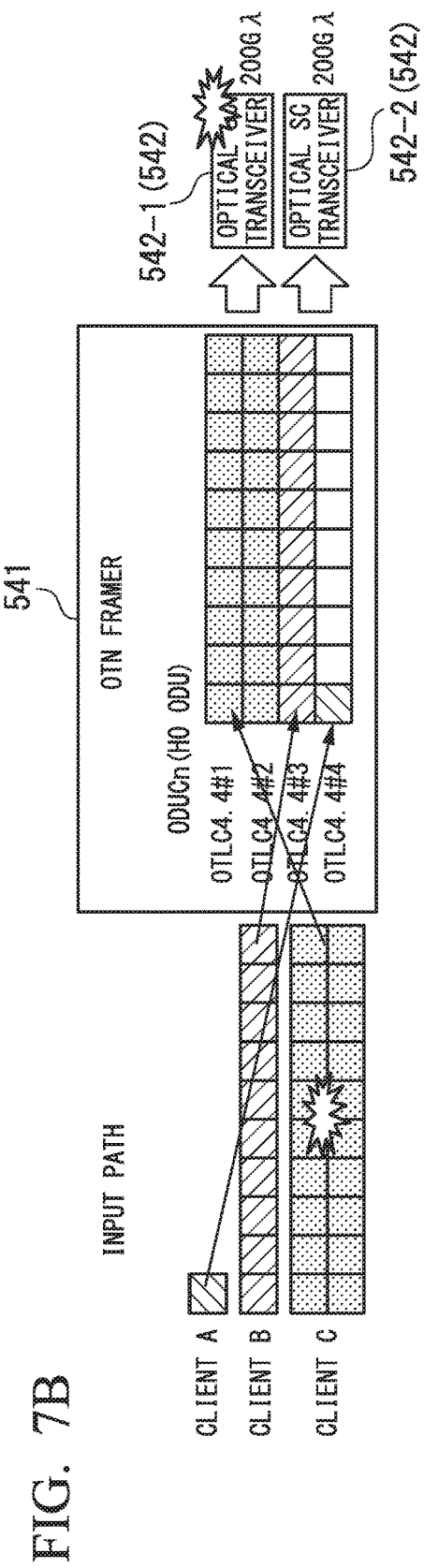

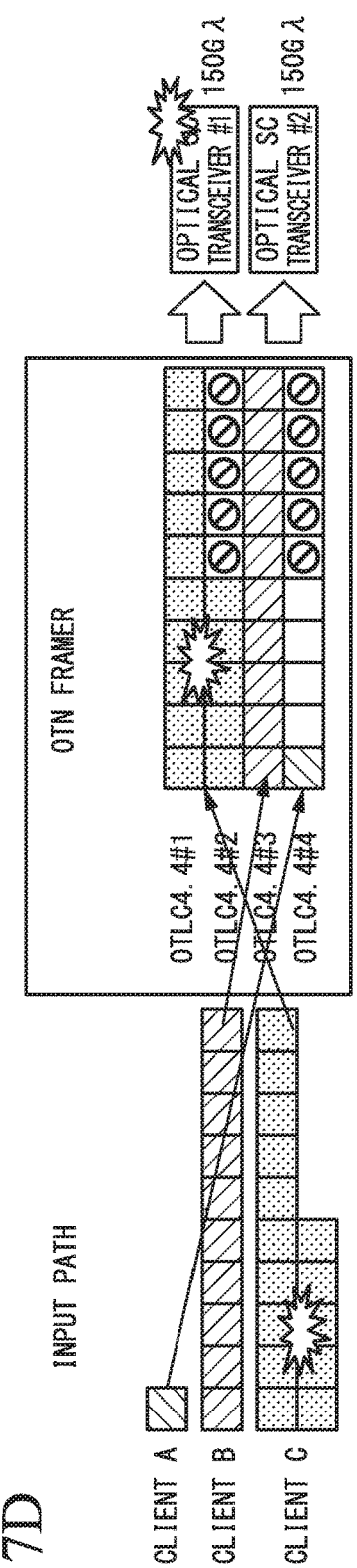

FRAMER, OPTICAL TRANSMISSION DEVICE, AND FRAMING METHOD

CROSS-REFERENCE TO RELATED APPLICATIONS

This application is a 371 U.S. National Stage of International Application No. PCT/JP2015/083379, filed on Nov. 27, 2015, which claims the benefit of and priority to Japanese Patent Application No. 2014-241493, filed on Nov. 28, 2014. The entire disclosures of the above applications are incorporated herein by reference.

TECHNICAL FIELD

The present invention relates to a framer, an optical transmission device, and a framing method.

BACKGROUND ART

In an optical transport network (OTN) which is a wide-area optical transport network with a large capacity, client signals based on various standards such as synchronous digital hierarchy (SDH), Ethernet (registered trademark) and the like are accommodated and transmitted.

In recent years, traffic of client signals has increased remarkably and thus OTNs have been standardized to cope with an increase in speed (for example, see Non-Patent Document 1). At present, optical channel transport unit-Cn (OTUCn) (where Cn denotes 100G×n) which is an OTN technique over 100 G (B100 G, where G is gigabits per second) is being studied (for example, see Non-Patent Document 2).

In OTUCn, a transmission capacity of one optical channel is a frequency band wider ha that in the conventional OTU. However, it is difficult to achieve an increase in capacity by extending single carrier transmission in a frequency band of one optical channel as before due to a relation with an operating speed of an electronic circuit which is used for an optical signal transceiver. Therefore, in OTUCn, an increase in capacity is realized by multicarrier transmission using a plurality of optical subcarriers in the frequency band of one optical channel.

PRIOR ART DOCUMENT

Non-Patent Document

Non-Patent Document 1: "Interfaces for the optical transport network," ITU-T G.709/Y.1331 February 2012
Non-Patent Document 2: "OTN Interface Technologies and Standardization Trend," Takuya Ohara, Communication Lecture Papers 2, 2014 General Conference of the Institute of Electronics, Information, and Communication Engineers, BI-5-1, SS-47-SS-48, March, 2014

SUMMARY OF INVENTION

Problem to be Solved by the Invention

A framer which is used in OTUCn interleaves electrical signals of OTUCn with a payload capacity of n×100 G to generate n optical channel transport lane-Cn.n (OTLCn.n) which are parallel signals with a payload capacity of 100 G.

The n parallel signals corresponding to one optical channel which are generated by the framer are converted into optical signals and multicarrier-transmitted by a plurality of optical subcarrier transceivers. The transmission band of each optical subcarrier transceiver is not limited to 100 G, but may be 150 G or 200 G depending on modulation/demodulation schemes of the optical subcarrier transceiver. An optical subcarrier transceiver with j×100 G (where j is an integer equal to or greater than 1 and equal to or less than n) optically transmits parallel signals with 100 G generated by the framer by one optical subcarrier.

For example, in the case of OTUC4, a framer generates four electrical signals of OTLC4.4 from an electrical signal of OTUC4 with a client signal is set. The four electrical signals of OTLC4.4 are referred to as OTLC4.4#1 to #4. When the transmission band of each optical subcarrier transceiver is 200 G, the first optical subcarrier transceiver transmits OTLC4.4#1 and OTLC4.4#2 using an optical subcarrier of 200 G and the second optical subcarrier transceiver transmits OTLC4.4#3 and OTLC4.4#4 using an optical subcarrier of 200 G.

At this time, a client signal of 100 G of Client A may be accommodated in OTLC4.4#1 and a client signal of 200 G of Client B may be accommodated in OTLC4.4 #2 and #3. In this case, when optical wavelengths are not available such as when the first optical subcarrier transceiver malfunctions, neither Client A nor Client B can communicate, which affects the frequency band corresponding to 300 G.

In this way, when one of the optical subcarriers performing multicarrier transmission malfunction or the like, there is a possibility that traffic in a frequency band wider than the frequency band of the corresponding optical subcarrier will be cut off.

In consideration of the above-mentioned circumstances, an object of the present invention is to provide a framer, an optical transmission device, and a framing method that can decrease an influence range in which traffic is cut off due to malfunction of an optical subcarrier when a plurality of parallel signals are multicarrier-transmitted.

Means for Solving the Problem

According the present invention, there is provided a framer which is connected to a plurality of transmitters that multicarrier-transmit a plurality of parallel signals by optical subcarriers, the framer including: a storage unit configured to store time slot information indicating a correspondence between time slots in a signal frame and the optical subcarriers which are used to transmit parallel signals including data set in the time slots and path accommodation information indicating a correspondence between paths allocated to a client signal and the time slots in the signal frame; an allocation processing unit configured to select, on the basis of empty time slots which are not allocated to any path indicated by the path accommodation information and the optical subcarriers corresponding to the empty time slots indicated by the time slot information, time slots to be allocated to a path to be accommodated from empty time slots such that the number of optical subcarriers corresponding to the time slots allocated to the path to be accommodated satisfies a predetermined condition and to set a correspondence between the path to be accommodated and the selected time slots as the path accommodation information; a multiplexing unit configured to set one or more received client signals to the time slots in the signal frame on the basis of the correspondence between the paths of the client signal and the time slots which is indicated by the path accommodation information; and a transmission signal generating unit configured to divide the signal frame to which the client signal is set by the multiplexing unit to generate a plurality of parallel signals and to output the plurality of parallel signals to the plurality of transmitters that transmit the plurality of parallel signals using the optical subcarriers corresponding to the plurality of parallel signals.

Preferably, the predetermined condition is a condition that the number of optical subcarriers corresponding to the time slots allocated to the path to be accommodated be minimized.

In a representative example, the framer further includes a device information acquiring unit configured to acquire information on a signal rate of the plurality of transmitters and the number of optical subcarriers, and the allocation processing unit determines, on the basis of the information acquired by the device information acquiring unit, the correspondence between the time slots and the optical to generate the time slot information.

According to the present invention, there is provided an optical transmission device including a framer generates a plurality of parallel signals and a plurality transmitters that multi-carrier transmit the plurality of parallel signals generated by the framer using optical subcarriers, the optical transmission device including: a storage unit configured to store time slot information indicating a correspondence between time slots in a signal frame and the optical subcarriers which are used to transmit parallel signals including data set in the time slots and path accommodation information indicating a correspondence between paths allocated to a client signal and the time slots in the signal frame; and an allocation processing unit configured to select, on the basis of empty time slots which are not allocated to any path indicated by the path accommodation information and the optical subcarriers corresponding to the empty time slots indicated by the time slot information, time slots to be allocated to a path to be accommodated from empty time slots such that the number of optical subcarriers corresponding to the time slots allocated to the path to be accommodated satisfies a predetermined condition and to set a correspondence between the path to be accommodated and the selected time slots as the path accommodation information, wherein the framer includes at least a multiplexing unit configured to set one or more received client signals to the time slots in the signal frame on the basis of the correspondence between the paths of the client signal and the time slots which is indicated by the path accommodation information, and a transmission signal generating unit configured to divide the signal frame to which the client signal is set by the multiplexing unit to generate a plurality of parallel signals and to output the plurality of parallel signals to the transmitters that transmit the plurality of parallel signals using the optical subcarriers corresponding to the plurality of parallel signals.

According to the present invention, there is provided a framing method which is performed by a framer which is connected to a plurality of transmitters that multicarrier-transmit a plurality of parallel signals by optical subcarriers, the framer including a storage unit configured to store time slot information indicating a correspondence between time slots in a signal frame and the optical subcarriers which are used to transmit parallel signals including data set in the time slots and path accommodation information indicating a correspondence between paths allocated to a client signal and the time slots in the signal frame, the framing method including: an allocation processing step of causing the framer to select, on the basis of empty time slots which are not allocated to any path indicated by the path accommodation information and the optical subcarriers corresponding to the empty time slots indicated by the time slot information, time slots to be allocated to a path to be accommodated from empty time slots such that the number of optical subcarriers corresponding to the time slots allocated to the path to be accommodated satisfies a predetermined condition and to set a correspondence between the path to be accommodated and the selected time slots as the path accommodation information; a multiplexing step of causing the framer to set one or more received client signals to the tune slots in the signal frame on the basis of the correspondence between the paths of the client signal and the time slots which is indicated by the path accommodation information; and a transmission signal generating step of causing the framer to divide the signal frame to which the client signal is set in the multiplexing step to generate a plurality of parallel signals and to output the plurality of parallel signals to the transmitters that transmit the plurality of parallel signals using the optical subcarriers corresponding to the plurality of parallel signals.

Effects of Invention

According to the present invention, it is possible to decrease an influence range in which traffic is cut off due to malfunction of an optical subcarrier or the like when a signal of one optical channel multicarrier-transmitted using a plurality of parallel signals.

BRIEF DESCRIPTION OF DRAWINGS

FIG. 7B is a diagram showing an example in which paths are mapped on ODUCn according to the embodiment.
FIG. 7D is a diagram showing an example in which paths are mapped on ODUCn-M according to the embodiment.

DESCRIPTION OF EMBODIMENTS

Hereinafter, embodiments of the present invention will be described with reference to the drawings.

Figure 1:
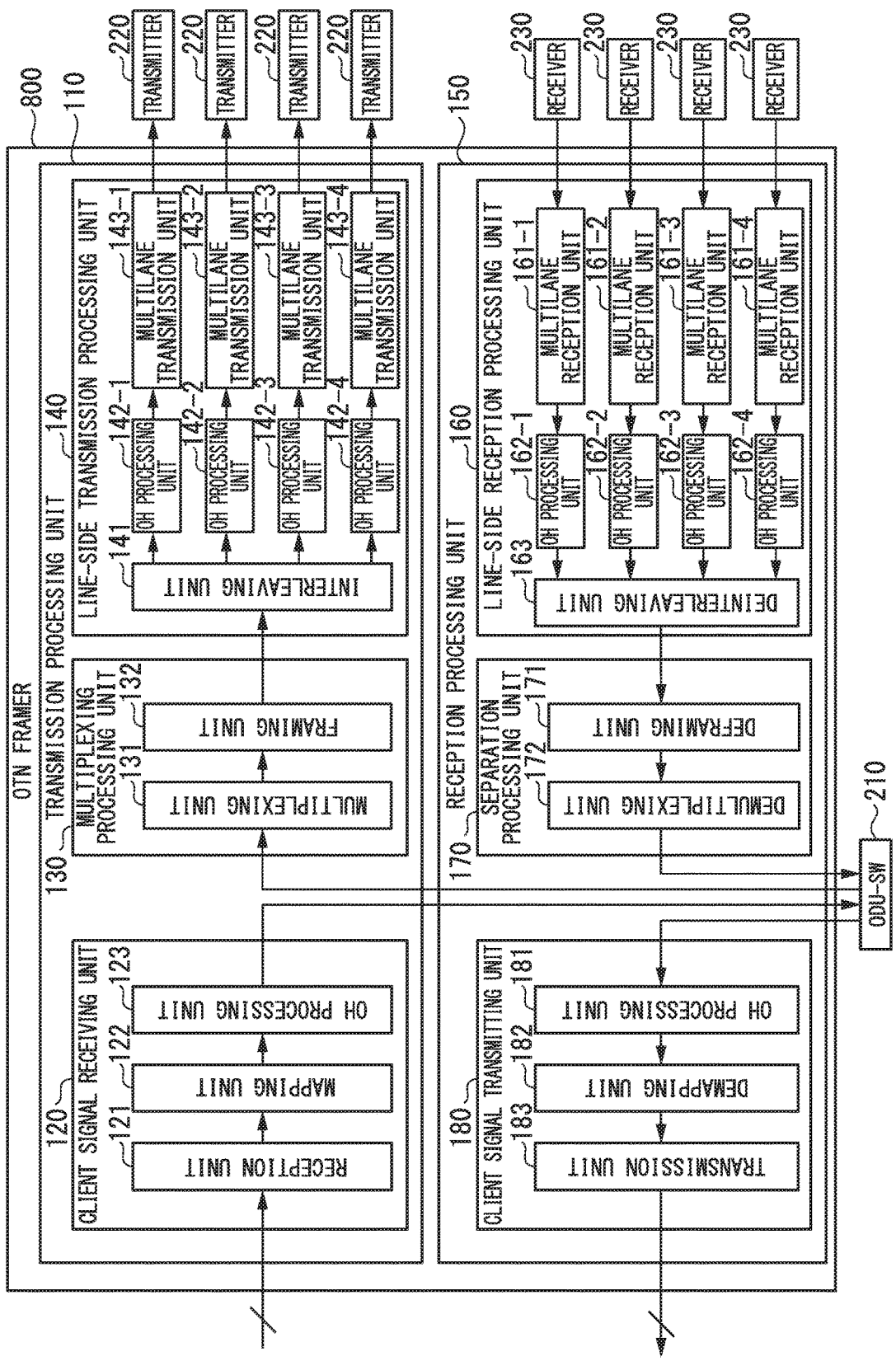
FIG. 1 is a functional block diagram showing a framer according to an embodiment of the present invention.

FIG. 1 is a functional block diagram showing an OTN framer 800 according to an embodiment of the present invention. The OTN framer 800 shown in the drawing performs communication using OTUCn (where Cn denotes 100 G×n and n is an integer greater than 2) which is an optical transport network (OTN) standard for transmission over 100 G (B100 G where G denotes gigabits per second). In the drawing, the case of n=4, that is, the case in which the OTN framer 800 performs communication using OTUC4, is shown.

In the OTN transport technique, client signals based on various communication schemes are accommodated and transmitted by optical transmission. In the OTN, a fixed frame structure is used and client signals are handled in units of tributary slots (TSs, which are also referred to as time slots) of 1.25 G (that is, a multiple thereof) using ODU0 (ODU: optical channel data unit) which is a minimum unit capable of accommodating Gigabit Ethernet (GbE; registered trademark)).

The OTN provides the same path management, the same operations, administration, and maintenance (OAM) function, and the same protection function as in synchronous digital hierarchy (SDH).

The OTN framer 800 separates a signal of one optical channel of n×100 G obtained by multiplexing a plurality of client signals to generate n parallel signals of 100 G. The n parallel signals are multi-carrier transmitted by a plurality of optical subcarriers but, physically, one parallel signal may be transmitted by one optical subcarrier or a plurality of parallel signals may be transmitted by one optical subcarrier.

Multicarrier transmission is a communication scheme in which the capacity of one channel is increased by transmitting a signal of one channel using a plurality of subcarriers (carrier waves). In multicarrier transmission, subcarriers are multiplexed at a high density and are electrically separated for each ground (destination).

When one parallel signal is transmitted by one optical subcarrier, the band of the optical subcarrier is 100 G. When two parallel signals are transmitted by one optical subcarrier, the band of the optical subcarrier is 200 G. In optical transmission, a modulation scheme such as 4 subcarrier-dual polarization-quadrature phase shift keying (4SC-DP-QPSK) or 2 subcarrier-dual polarization-quadrature amplitude modulation (2SC-DP-16QAM) is used.

As shown in FIG. 1, the OTN framer 800 includes a transmission processing unit 110 and a reception processing unit 150.

The transmission processing unit 110 includes a client signal receiving unit 120, a multiplexing processing unit 130, and a line-side transmission processing unit 140.

The client signal receiving unit 120 includes a reception unit 121, a mapping unit 122, and an OH processing unit 123.

The reception unit 121 receives a client signal.

The mapping unit 122 maps the client signal received by the reception unit 121 on a payload of a lower order optical channel data unit (LO ODU) frame.

The OH processing unit 123 adds overhead (OH) to the LO ODU frame in which the client signal is set by the mapping unit 122.

The OH processing unit 123 outputs an electrical path signal of the LO ODU frame to an ODU switch (hereinafter referred to as "ODU-SW") 210.

The ODU-SW 210 is connected to another OH framer 800 and performs path exchange of the electrical path signal.

The multiplexing processing unit 130 includes a multiplexing unit 131 and a framing unit 132.

The multiplexing unit 131 sets the electrical path signal received from the ODU-SW 210 to the LO ODU frame. The multiplexing unit 131 first maps the LO ODU frame on an optical channel data tributary unit (ODTU) frame and then time-multiplexes a plurality of ODTU frames to generate an ODUCn frame which is a higher-order ODU (HO ODU).

The framing unit 132 adds OH and forward error correction (FEC) to the ODUCn frame generated by the multiplexing unit 131 to generate an OTUCn frame. The framing unit 132 outputs a signal of the OTUCn frame to the line-side transmission processing unit 140.

The line-side transmission processing unit 140 includes an interleaving unit 141, OH processing units 142-1 to 142-*n*, and multilane transmission units 143-1 to 143-*n* (n=4 in FIG. 1 as described above).

The interleaving unit 141 receives a signal of an OTUCn frame from the multiplexing processing unit 130, and byte-interleaves the received signal of the OTUCn frame of n×100 G (interleaves in units of bytes) to generate a signal of n OTLCn.n frames. The OTLCn.n frames are frames of parallel signals of 100 G. The i-th OTLCn.n frame is referred to as an OTLCn.n#i frame (where i is an integer ranging from 1 to n). The interleaving unit 141 outputs the generated n OTLCn.n#i frames to the OH processing units 142-*i*.

The OH processing units 142-1 to 142-*n* set OH for the OTLCn.n frames received from the interleaving unit 141. The OH processing units 142-*i* output the OTLCn.n#i frame for which OH is set to the multilane transmission units 143-1 to 143-*n*.

The multilane transmission units 143-1 to 143-*n* output parallel signals of the OTLCn.n frames received from the OH processing units 142-1 to 142-*n* to transmitters 220. For example, the multilane transmission units 143-*i* output parallel signals of OTLCn.n#i frames to the transmitters 220 in parallel using four electrical wires of 28 G.

The transmitters 220 use optical subcarriers of different optical frequencies. The transmitters 220 convert the received parallel signals from electrical signals to optical signals and multicarrier-transmit the optical signals.

A plurality of multilane transmission units 143-*i* may be connected a single transmitter 220. When j (where j ranges from 2 to n) multilane transmission units 143-*i* are connected to one transmitter 220, the transmitter 220 transmits j parallel signals by optical subcarriers of j×100 G.

The reception processing unit 150 includes a line-side reception processing unit 160, a separation processing unit 170, and a client signal transmitting unit 180.

The line-side reception processing unit 160 includes multilane reception units 161 to 161-*n*, OH processing units 162-1 to 162-*n*, and a deinterleaving unit 163.

The multilane reception units 161-1 to 161-*n* receive optical signals received by receivers 230 using multicarrier transmission and convert the received optical signals into electrical signals. The receivers 230 receive the optical signals using optical subcarriers of different optical frequencies.

The multilane reception units 161-*i* output the electrical signals received in parallel from the receivers 230 to the OH processing units 162-*i*, for example, using electrical wires of 28 G.

The OH processing units 162-1 to 162-*n* determine a head of a frame from the received signals on the basis of a frame alignment signal (FAS) or a multi-frame alignment signal (WAS) set in the OH of the OTLCn.n frame. By determining the head position, the OH processing units 162-*i* compensate for a delay time difference, extract the OTLCn.n#i frame from the received signals, and output the extracted frame to the deinterleaving unit 163.

The deinterleaving unit 163 deinterleaves the OTLCn.n#1 frame to the OTLCn.n#n frame received from the OH processing units 162-1 to 162-nt to generate one OTUCn frame.

The separation processing unit 170 includes a deframing unit 171 and a demultiplexing unit 172.

The deframing unit 171 FEC-decodes signals of the OTUCn frames generated by the deinterleaving unit 163, extracts ODUCn frames in which the LO ODU frame is time-multiplexed from the decoded OTUCn frames, and outputs the extracted ODUCn frames to the demultiplexing unit 172.

The demultiplexing unit 172 extracts LO ODU frames in which the client signals are set from the signals of the ODUCn frames extracted by the deframing unit 171, and outputs electrical path signals of the LO ODU frames to the ODU-SW 210.

The client signal transmitting unit 180 includes an OH processing unit 181, a demapping unit 182, and a transmission unit 183.

The OH processing unit 181 receives the electrical path signal from the ODU-SW 210 and decodes the LO ODU frames from the received electrical path signals. The OH processing unit 181 performs OH processing on the LO ODU frames, and outputs the processing result to the demapping unit 182.

The demapping unit 182 receives the electrical path signals of the LO ODU frames from the OH processing unit 181, extracts the client signals from the received electrical path signals, and outputs the extracted client signals to the transmission unit 183.

The transmission unit 183 transmits the client signals extracted by the demapping unit 182.

The client signal receiving unit 120 and the multiplexing unit 130 may be connected without using the ODU-SW 210 and the separation processing unit 170 and the client signal transmitting unit 180 may be connected without using the ODU-SW 210.

Figure 2:
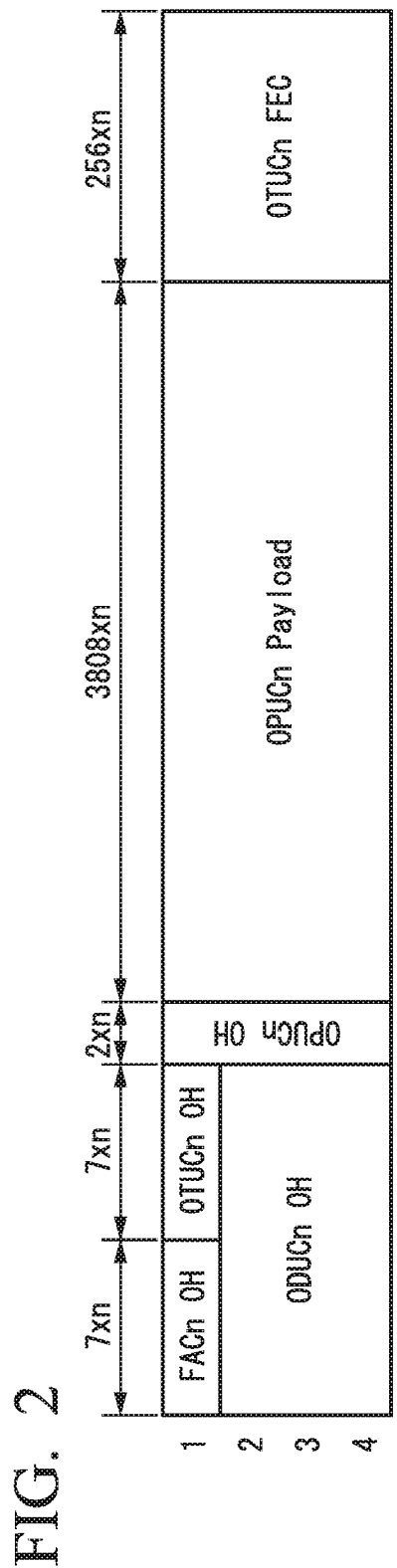
FIG. 2 is a diagram showing a frame structure of OTUCn.

FIG. 2 is a diagram showing a frame structure of OTUCn.

OTUCn is generated by adding FACn OH, OTUCn OH, OPUCn OH, and OTUCnFEC to ODUCn. OTUCn is marked in four rows and 4080×n columns.

Client signals are mapped on the (16×n+1-th to 3824×n-th OPUCn payloads of OTUCn.

OH is set in the first 16×n-th columns of the OTUCn frame.

FACn OH is set in the first to 7×n-th columns of the first row. FACn OH includes information required for frame synchronization.

OTUCn OH accommodating section monitoring information of an optical channel is inserted into the (7×n+1)-th to 14×n-th columns.

ODUCn OH is inserted into the first to 14×n-th columns of the second to fourth rows and accommodates path management and operation information of an optical channel.

OTUCn OH is inserted into the (14×n+1)-th to 16×n-th columns and accommodates information required for mapping/demapping of the client signals or the like.

Parity check bytes for FEC are added to the OTUCn FEC of the (3824×n+1)-th to 4080×n-th columns. The FEC of the OTUCn frame may be omitted. The OTUCn FEC area is not limited to the (3824×n+1)-th to 4080×n-th areas but may be changed to an area including an arbitrary number of bytes.

Figure 3:
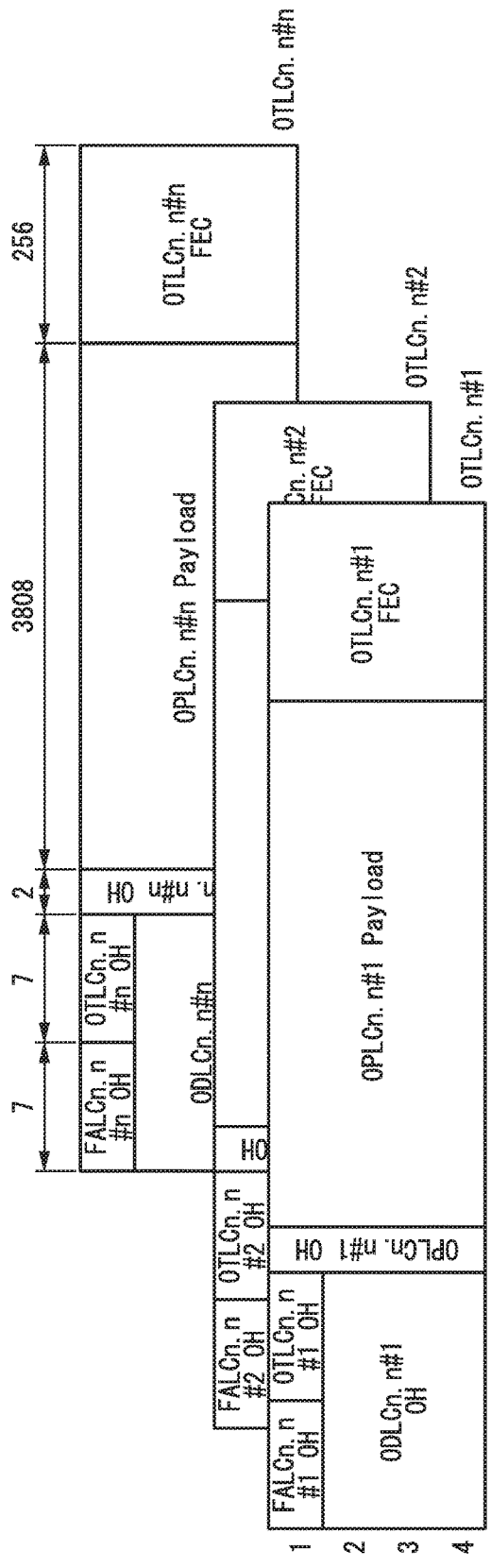
FIG. 3 is a diagram showing a frame structure of OTL-Cn.n.

FIG. 3 is a diagram showing a frame structure of OTL-Cn.n.

The OTLCn.n is marked in four rows and 4080 columns. OTLCn.n#1 to OTLCn.n#n are acquired by dividing an OTUCn frame by byte interleaving.

OTUCn payloads of the OTUCn are mapped on OPUCn.n#i payloads of the 17th to 3824th columns of the OTLCn.n#i.

OH is set in the 1st to 16th columns of the OTLCn.n#i. The OH of the OTLCn.n#i is set on the basis of the OTUCn OH or the like.

FACn.n#i OH is set in the 1st to 7th columns of the 1st row FACn.n#i OH includes information required for frame synchronization.

OTUCn.n#i OH accommodating section monitoring information of an optical channel is inserted into the 8th to 14th columns.

ODUCn.n#i OH is inserted into the 1st to 14th columns of the 2nd to 4th rows and accommodates path management and operation information of an optical channel.

OPUCn.n#i OH is inserted into the 15th to 16th columns and accommodates information required for mapping/demapping of the client signals or the like.

Parity check bytes for FEC are added to the OTUCn.n#i FEC of the 3825th to 4080th columns. The FEC of the OTUCn.n#i frame may be omitted. The OTUCn.n#i FEC area is not limited to the 3825th to 4080th areas but may be changed to an area including an arbitrary number of bytes.

Figure 4:
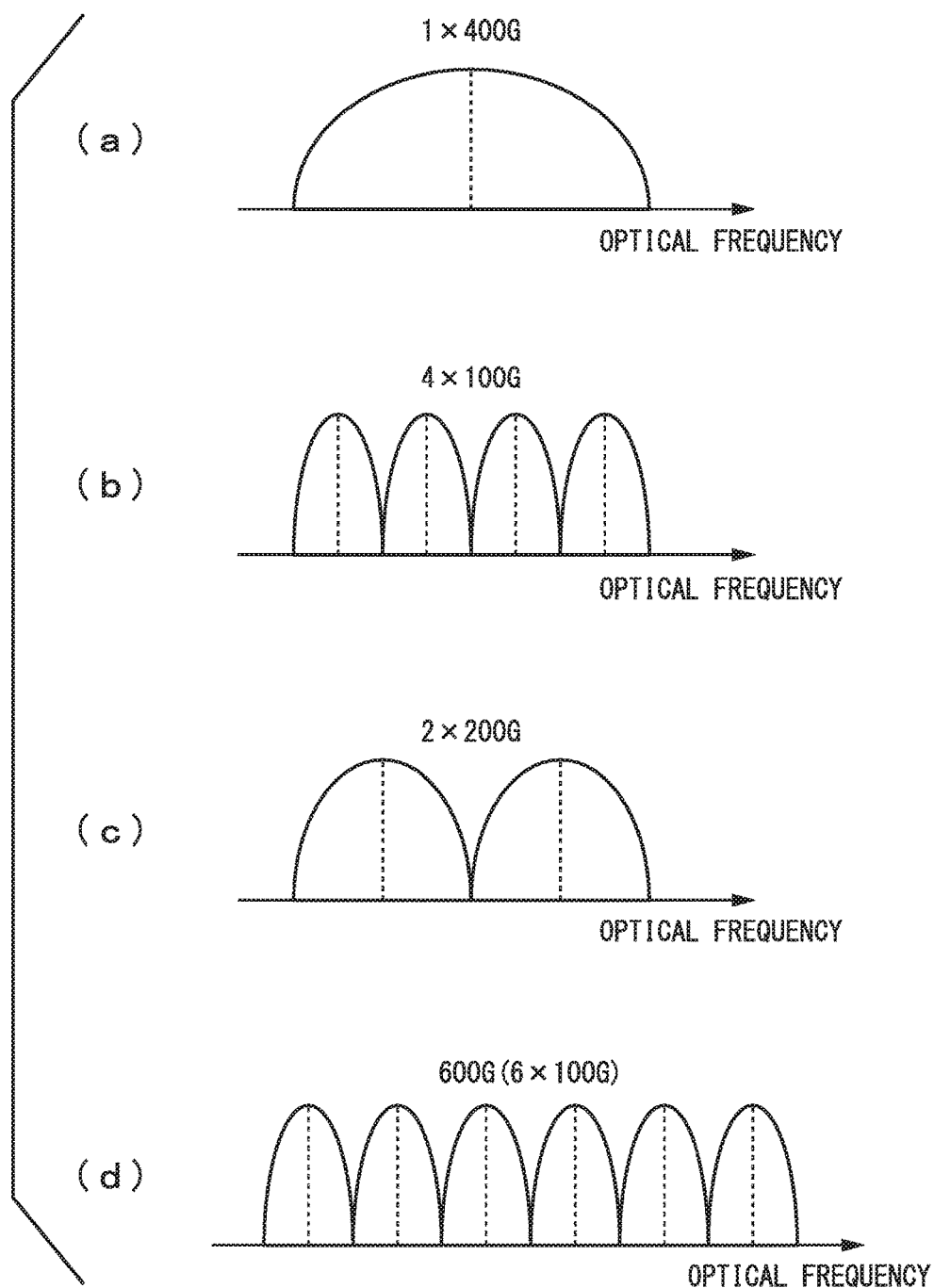
FIG. 4 is a diagram showing an optical channel which is used to transmit an optical signal.

FIG. 4 is a diagram showing an optical channel that is used to transmit an optical signal.

FIG. 4(a) is a diagram showing an optical channel when an optical signal of 400 G is serially transmitted by one optical frequency (a single carrier), and FIG. 4(b) is a diagram showing an optical channel when an optical signal of 400 G is parallel-transmitted (multicarrier transmitted) by four optical subcarriers.

In a conventional electronic circuit, due to constraints on an operating speed, it is difficult to continuously extend a band in which an optical signal can be serially transmitted by one optical frequency over 100 G as shown in FIG. 4(a). Therefore, in the OTUCn, broadband transmission is realized with no constraint on the electronic circuit by parallel-transmitting a band over 100 G by a plurality of optical subcarriers. Optical polarization division multiplexing, multilevel modulation or the like is used for the parallel transmission. The band of an optical subcarrier varies depending on a modulation scheme.

FIG. 4(b) shows an example in which one optical channel of 400 G is parallel-transmitted by four optical subcarriers of 100 G, and FIG. 4(c) shows an example in which one optical channel of 400 G is parallel-transmitted by two optical subcarriers of 200 G. By changing n, flexibility capable of increasing the transmission hand by 100 G is provided as shown in FIG. 4(d).

Figure 5:
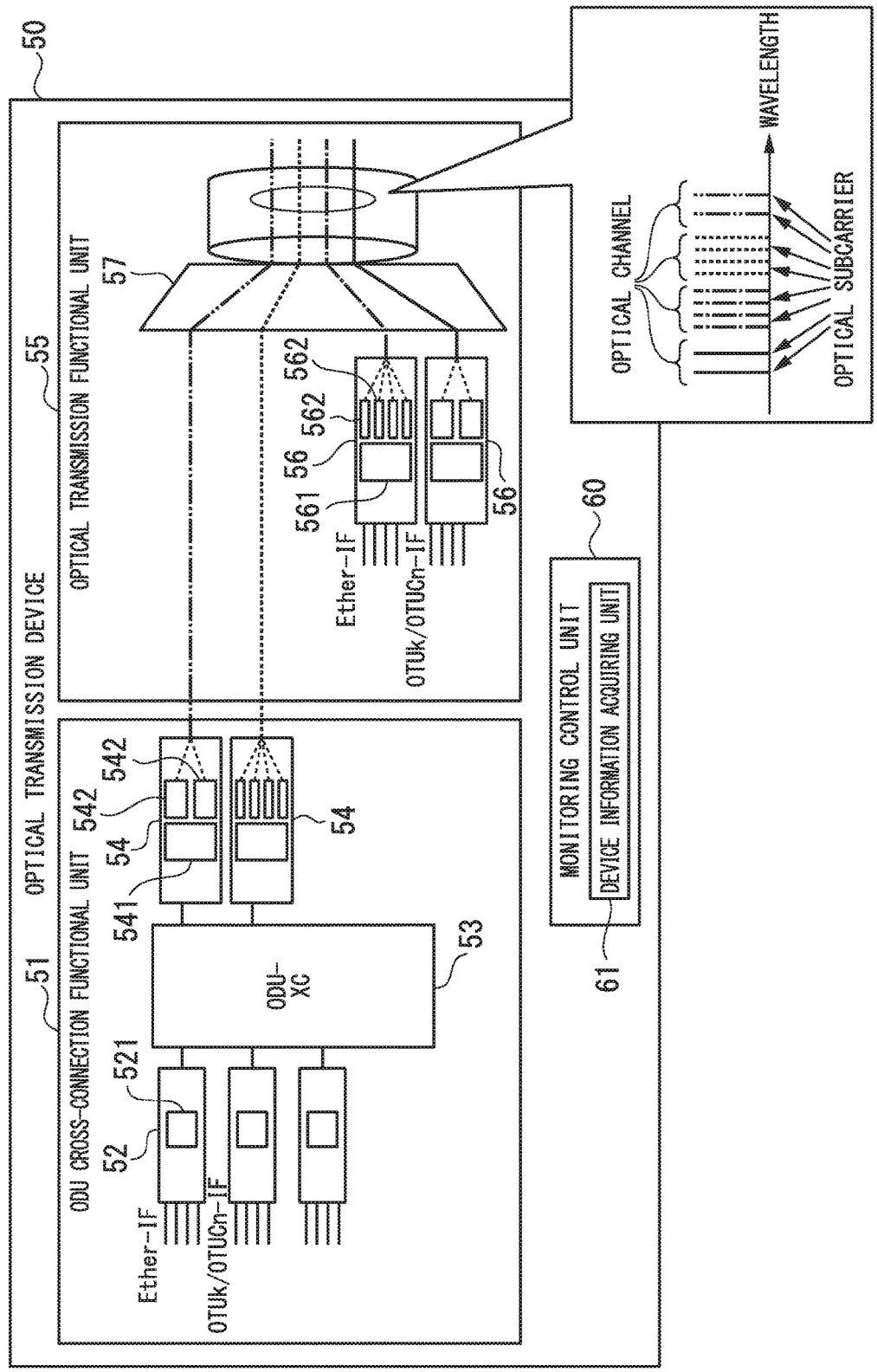
FIG. 5 is a diagram showing an example of a configuration of an optical transmission device according to the embodiment of the present invention.

FIG. 5 is a diagram showing an example of a configuration of an optical transmission device 50 according to an embodiment of the invention.

The optical transmission device 50 includes an ODU cross-connection functional unit 51, an optical transmission functional unit 55, and a monitoring control unit 60.

In the ODU cross-connection functional unit 51, one or more user-network interface (UNI) cards 52 and one or more network-network interface (NNI) cards 54 are connected to each other via an ODU XC (cross-connection) 53.

The UNI card 52 is connected to a client-side communication device in accordance with its communication standard. An OTN framer 521 of the UNI card 52 has the functions of the client signal receiving unit 120 and the client signal transmitting unit 180 of the OTN framer 800 shown in FIG. 1.

ODU-XC 53 corresponds to the ODU-SW 210 shown in FIG. 1.

The NNI card 54 includes an OTN framer 541 and optical subcarrier (SC) transceivers 542.

The OTN framer 541 has the functions of the multiplexing processing unit 130, the line-side transmission processing unit 140, the line-side reception processing unit 160, and the separation processing unit 170 of the OTN framer 800 shown in FIG. 1.

The optical SC transceiver 542 has the function of the transmitter 220 and the receiver 230 shown in FIG. 1. The optical SC transceiver 542 includes, for example, a digital signal processor (DSP).

The optical transmission functional unit 55 includes transponders 56 and a multiplexer-demultiplexer 57.

The transponders 56 include an OTN framer 561 and optical SC transceivers 562. The OTN framer 561 has the function of the OTN framer 800 shown in FIG. 1, and the optical SC transceivers 562 have the functions of the transmitter 220 and the receiver 230 shown in FIG. 1. The optical SC transceivers 562 include, for example, a DSP.

The multiplexer-demultiplexer 57 performs wavelength division multiplexing (WDM) of an optical signal. The multiplexer-demultiplexer 57 is connected to the optical SC transceivers 542 of the NNI cards 54 and the optical SC transceivers 562 of the transponders 56. The multiplexer-demultiplexer 57 multiplexes optical signals received from the optical SC transceivers 542 of the NNI cards 54 and the optical SC transceivers 562 of the transponders 56 and transmits the multiplexed optical signals to another reception-side optical transmission device 50. The multiplexer-demultiplexer 57 demultiplexes an optical signal received from another transmission-side optical transmission device 50 and outputs the demultiplexed optical signals to the optical SC transceivers 542 of the NNI cards 54 and the optical SC transceivers 562 of the transponders 56.

The NNI cards 54 and the transponders 56 use optical channels of different optical frequencies.

The NNI card 54 including four optical SC transceivers 542 or the transponder 56 including tour optical SC transceivers 562 transmits an optical signal of one optical channel using four optical subcarriers.

The NNI card 54 including two optical SC transceivers 542 or the transponder 56 including two optical SC transceivers 562 transmits an optical signal of one optical channel using two optical subcarriers.

The optical transmission device 50 may be configured not to include either of the ODU cross-connection functional unit 51 and the transponder 56.

When the modulation scheme of the optical SC transceiver 542 or the optical SC transceiver 562 is variable, the band of an optical subcarrier is changed depending on the modulation scheme. For example, the band of one optical subcarrier is 100 G in QPSK modulation, the band of one optical subcarrier is 150 G in 8QAM modulation, and the band of one optical subcarrier is 200 G in 16QAM modulation. Accordingly, physically, the number of optical SC transceivers 542 to be operated can be set to be equal to or less than n by preparing n optical SC transceivers 542 in the NNI card 54 and changing the modulation scheme of the optical SC transceivers 542.

Similarly, physically, the number of optical SC transceivers 562 to be operated can be set to be equal to or less than n by preparing n optical SC transceivers 562 in the transponder 56 and changing the modulation scheme of the optical SC transceivers 562.

The monitoring control unit 60 performs monitoring and control of the units of the optical transmission device 50. The monitoring control unit 60 includes a device information acquiring unit 61. The device information acquiring unit 61 acquires information on a current signal rate or a current number of optical subcarriers of the optical SC transceivers 542 under operation among the optical SC transceivers 542 of the NNI card 54 and notifies the OTN framer 541 of the acquired information. The device information acquiring unit 61 acquires information on a current signal rate or a current number of optical subcarriers of the optical SC transceivers of the transponder 56 and notifies the OTN framer 561 of the acquired information.

Figure 6:
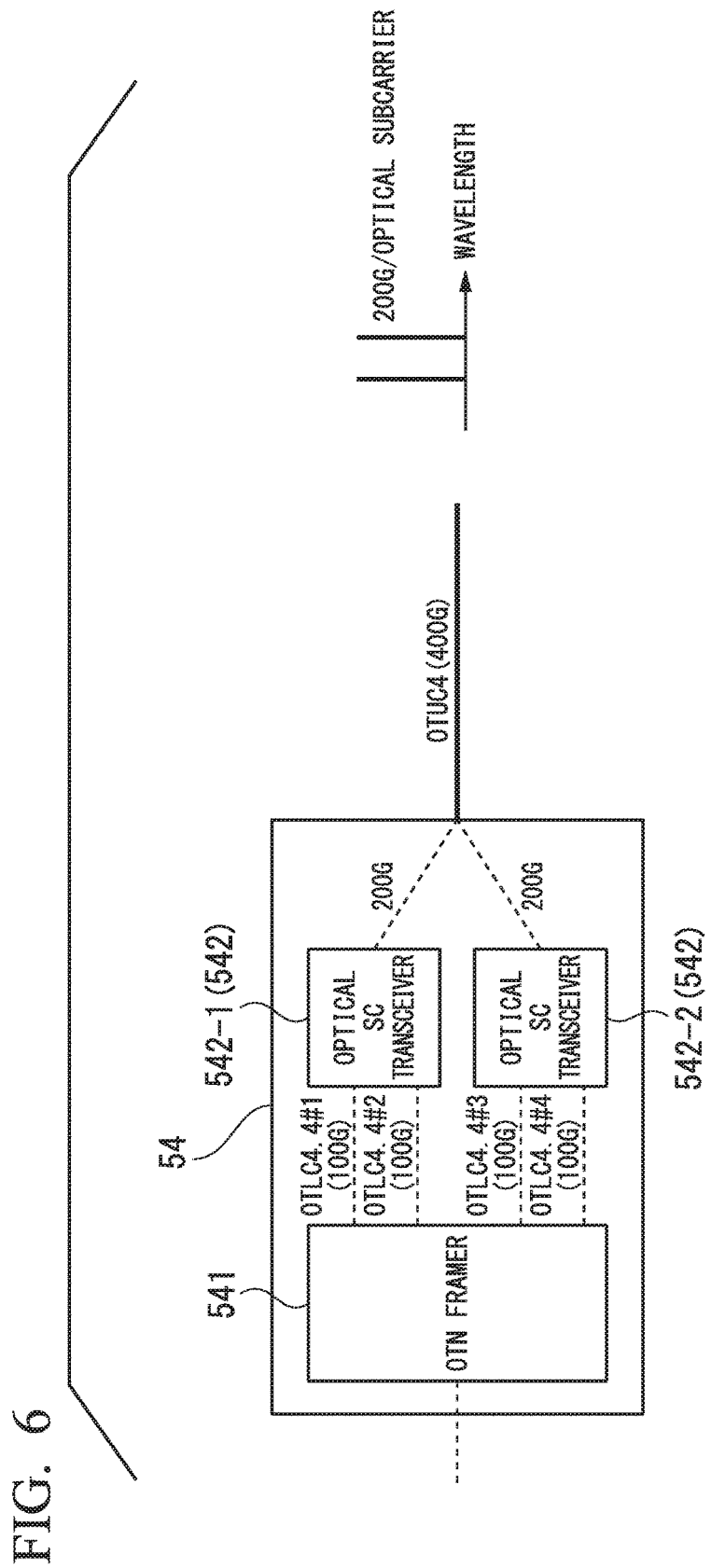
FIG. 6 is a diagram showing frequency bands of signals which are transmitted in an NNI card.

FIG. 6 is a diagram showing a band of a signal transmitted in the NNI card 54. In the drawing, an example in which the NNI card 54 has a configuration for realizing OTUC4 is shown.

The NNI card 54 shown in the drawing transmits parallel signals of OTLC4.4#1 to OTLC4.4#4 output from the OTN framer 541 using two optical SC transceivers 542. The two optical SC transceivers 542 are referred to as optical SC transceivers 542-1 and 542-2. The band of each parallel signal is 100 G.

The optical SC transceiver 542-1 transmits parallel signals of OTLC4.4#1 and OTLC4.4#2 using an optical subcarrier of 200 G, and the optical SC transceiver 542-2 transmits parallel signals of OTLC4.4#3 and OTLC4.4#4 using an optical subcarrier 200 G.

An OTUC4 signal of one optical channel of 400 G is multicarrier-transmitted using two optical subcarriers of 200 G by the optical SC transceiver 542-1 and the optical SC transceiver 542-2.

Figure 7A:
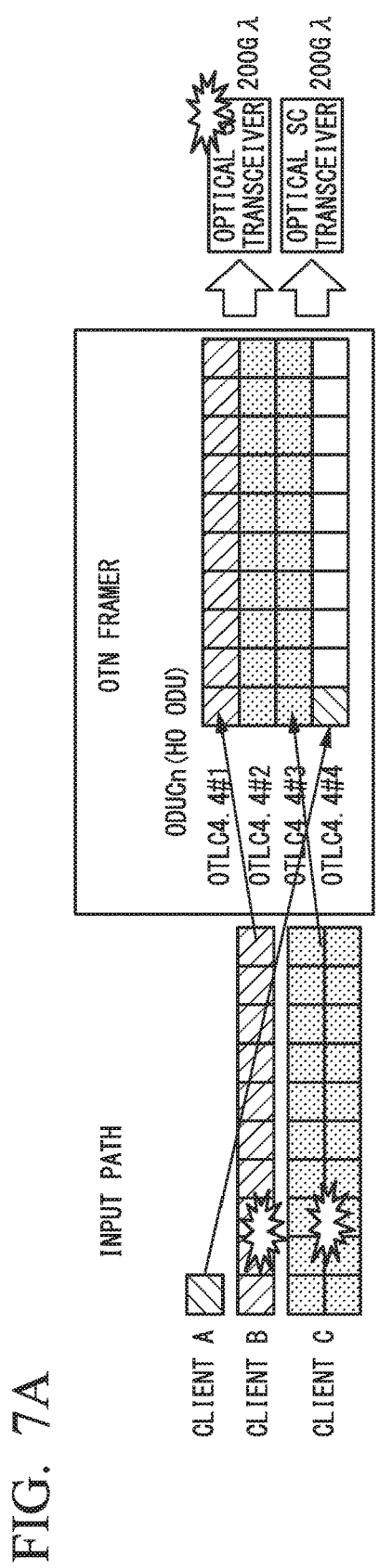
FIG. 7A is a diagram showing an example in which paths are mapped on ODUCn according to a conventional art.

FIGS. 7A and 7B are diagrams showing mapping of paths on ODUCn. In the drawings, an example in which paths are mapped on ODUC4, the parallel signals of OTLC4.4#1 and OTLC4.4#2 are transmitted by the optical subcarrier of one optical SC transceiver, and the parallel signals of OTLC4.4#3 and OTLC4.4#4 are transmitted by the optical subcarrier of another optical SC transceiver is shown.

A path capped on ODUC4 is a logical path that is allocated to a client signal and corresponds to one LO ODU frame or one ODTU frame.

On which of OTLC4.4#1 to OTLC4.4#4 a TS of 1.25 G in the ODUC4 frame should be mapped is statically or dynamically determined in advance. FIGS. 7A and 7B show a case in which TSs of the first row of an HO ODU frame are mapped on OTLC4.4#1, TSs of the second row are mapped on OTLC4.4#2, TSs of the third row are mapped on OTLC4.4#3, and TSs of the fourth row are mapped on OTLC4.4#4.

In the drawing, TSs corresponding to 100 G of OTLC4.4#i are shown as ten TSs in one row, for the purpose of simplification. Hereinafter, a group of TSs mapped on OTLC4.4#i in ODUCn is referred to as an area of OTLC4.4#i.

It is assumed that a used hand of Client A is 10 G, a used hand of Client B is 100 G, and a used band of Client C is 200 G In FIG. 7A, the OTN framer accommodates the path of Client A among input paths in the area of OTLC4.4#4 accommodates the path of Client B in the area of OTLC4.4#1, and accommodates the path of Client C in the area of OTLC4.4#2 and the area of OTLC4.4#3.

Accordingly, when the optical SC transceiver that transmits the parallel signals of OTLC4.4#1 and OTLC4.4#2 malfunctions, 300 G of two paths of the path of Client B and the path of Client C malfunctions. In this way, when one path is accommodated in parallel signals of a plurality of optical subcarriers and the optical SC transceiver cannot transmit and receive a signal for a certain reason, an influence of the path in which a signal is cut off may widen.

Therefore, the OTN framer 541 of the NNI card 54 in this embodiment accommodates one path in TSs to transmit the parallel signal by one optical subcarrier, that is, by one optical SC transceiver 542.

For example, the OTN framer 541 accommodates the path of Client A in the area of OTLC4.4#4, accommodates the path of Client B in the OTLC4.4#3 area, and accommodates the path of Client C in the area of OTLC4.4#1 and the area of OTLC4.4#2.

By accommodating the paths in this way, when the optical SC transceiver 542-1 transmitting the parallel signals of OTLC4.4#1 and OTLC4.4#2 malfunctions, the malfunction remains in only one path (200 G) of Client C and the path in which a signal is cut off can be prevented from widening.

An OTUCn frame is constituted in units of 100 G as described above, but the invention can be applied to optical transmission of a frame constituted in arbitrary units.

For example, in OTUCn-M being studied as an alternative to OTUCn, a transmission rate cat be set to a unit of 1M=5 gigabits per second, and the transmission rate is set to 300 equal to "5×60" gigabits per second in the case of M=60.

Figure 7C:
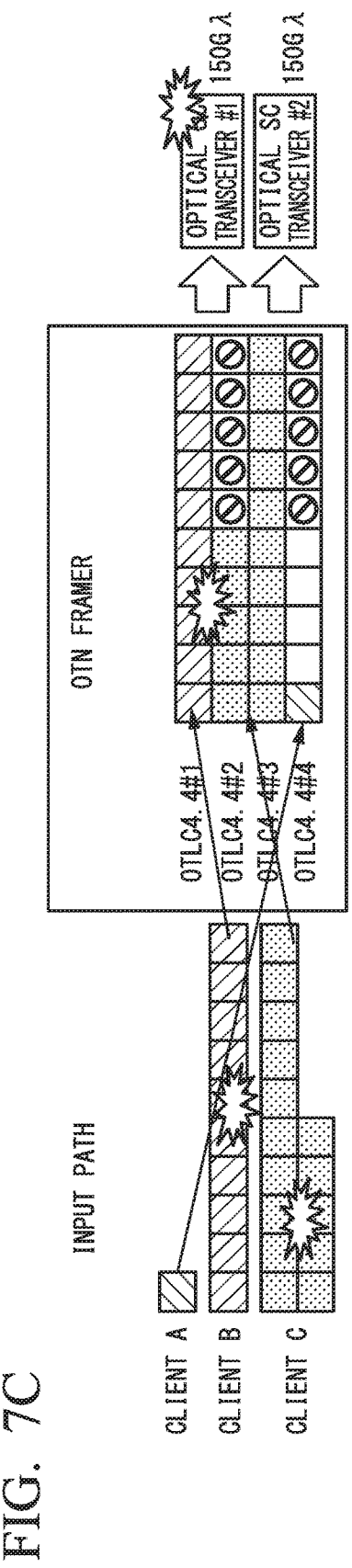
FIG. 7C is a diagram showing an example in which paths are mapped on ODUCn-M according to the conventional art.

Mapping examples corresponding to FIGS. 7A and 7B in this case are shown in FIGS. 7C and 7D. Here, in TSs of 100 G of OTLC4.4#i, unavailable areas are set (50 G of a right half in each of OTLC4.4#2 and OTLC4.4#4 in the drawings) and accommodation of a path of a client signal is performed outside of those areas.

The optical SC transceiver of #1 on the upper side transmits parallel signals of OTLC4.4#1 and OTLC4.4#2 by an optical subcarrier of 150 G, and the optical SC transceiver of #2 on the lower side transmits parallel signals of OTLC4.4#3 and OTLC4.4#4 by an optical subcarrier of 150 G.

The capacity of the signal of Client C is 150 G which is less than that in FIGS. 7A and 7B. However, in this case, when the invention is not applied as shown in FIG. 7C, the path of Client C may be accommodated in the areas of OTLC4.4#2 and OTLC4.4#3, and when the optical SC transceiver of #1 transmitting the parallel signals of OTLC4.4#1 and OTLC4.4#2 malfunctions, 250 G of two paths of the path of Client B and the path of Client C malfunctions.

On the other hand, when the invention is applied, one path is accommodated in TSs to transmit the parallel signal by one optical subcarrier, that is, one optical SC transceiver. Accordingly, when the optical SC transceiver of #1 transmitting the parallel signals of OTLC4.4#1 and OTLC4.4#2 malfunctions, the malfunction remains in only one path (150 G) of Client C and the path in which a signal is cut off can also be prevented from widening in this case.

While the case of the NNI card 54 has been described above, the same is true of the transponder 56.

Figure 8:
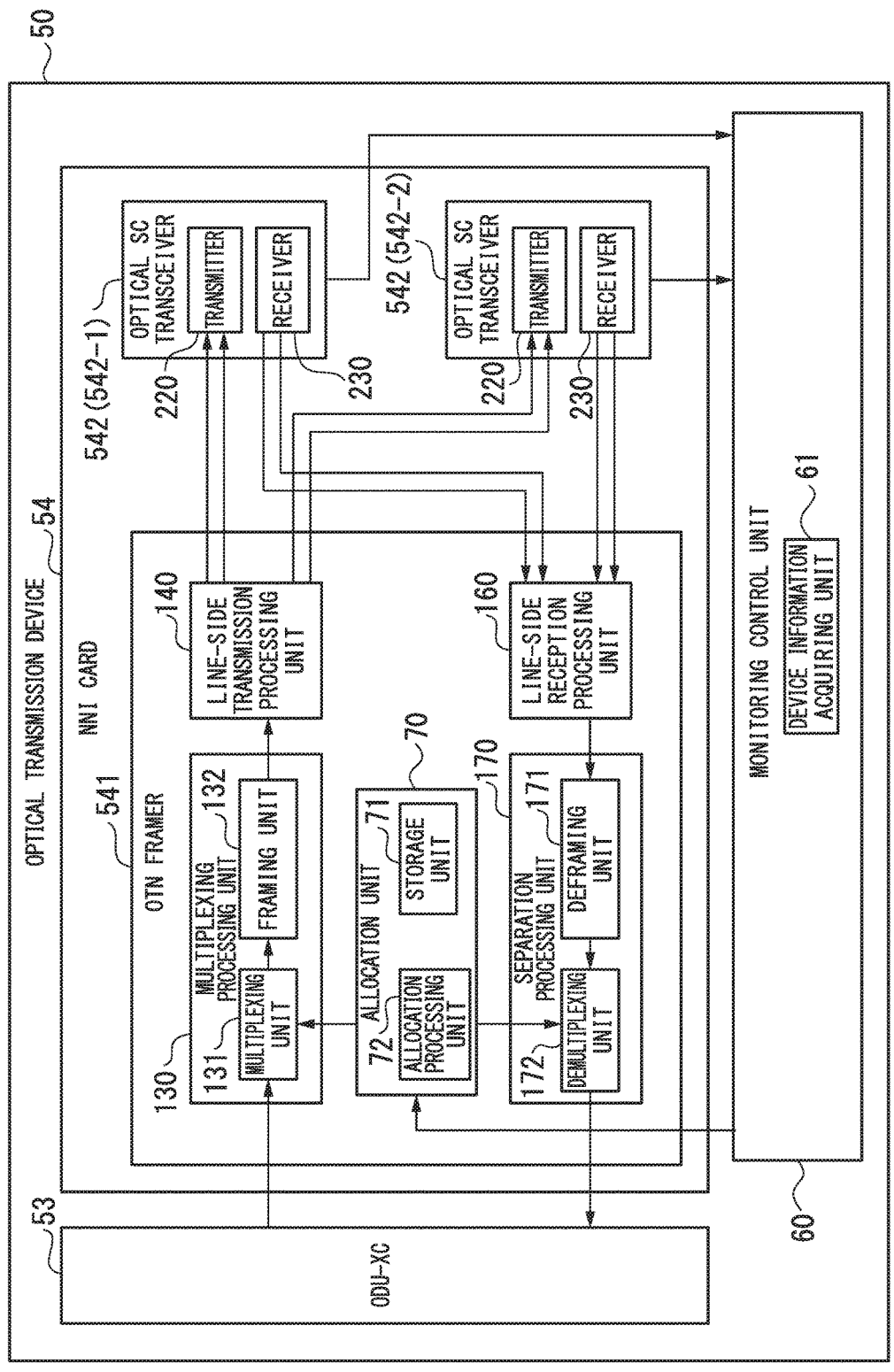
FIG. 8 is a functional block diagram showing an example of a configuration of an NNI card.

FIG. 8 is a functional block diagram showing a detailed configuration of the NNI card 54 of the optical transmission device 50. In the drawing, the same elements as in the OTN framer 800 shown in FIG. 1 and the optical transmission device 50 shown in FIG. 5 will be referenced by the same reference numerals and description thereof will not be repeated.

The NNI card 54 having a configuration for realizing OTUCn includes k optical SC transceivers 542 (where n≥k and k is an integer). In the drawing, the case of k=2 will be shown as an example.

Each optical SC transceiver 542 includes a transmitter 220 and a receiver 230. The OTN framer 541 of the NNI card 54 includes an allocation unit 70, a multiplexing processing unit 130, a line-side transmission processing unit 140, a line-side reception processing unit 160, and a separation processing unit 170.

The allocation unit 70 includes a storage unit 71 and an allocation processing unit 72.

The storage unit 71 stores time slot information and path accommodation information. The time slot information indicates an optical subcarrier (or an optical SC transceiver 542) corresponding to each TS of ODUCn. That is, the time slot information indicates a correspondence between TSs in ODUCn as a signal frame and an optical subcarrier used to transmit a parallel signal including data of a client signal set in the TS. The path accommodation information indicates a TS of ODUCn to which a path of each client signal is allocated.

The allocation processing unit 72 determines to which optical subcarrier (or which optical SC transceiver 542) TSs of ODUCn correspond on the basis of information on the signal rate or the number of optical subcarriers of the optical SC transceiver 542 received from the device information acquiring unit 61, generates the time slot information, and writes the generated time slot information to the storage unit 71. The allocation processing unit 72 calculates the number of TSs which it is necessary to allocate to the transmission capacity of the path of a client signal to be accommodated, which is input by an operator.

The allocation processing unit 72 acquires information on empty TSs which are not allocated to any path from the path accommodation information stored in the storage unit 71, and allocates TSs corresponding to the number of TSs which it is necessary to allocate among the empty TSs to the path of the client signal to be accommodated. At this time, the allocation processing unit 72 determines TSs to be allocated using a pattern in which the number of optical subcarriers corresponding to the allocated TSs satisfies a predetermined condition among patterns in which the TSs corresponding to the number of TSs which it is necessary to allocate can be allocated, on the basis of the optical subcarriers corresponding to the empty TSs indicated by the time slot information.

Specifically, the allocation processing unit 72 selects TSs to be allocated using a pattern in which the number of optical subcarriers corresponding to TSs allocated to the path to be accommodated is a minimum among the patterns in which TSs can be allocated.

Figure 9:
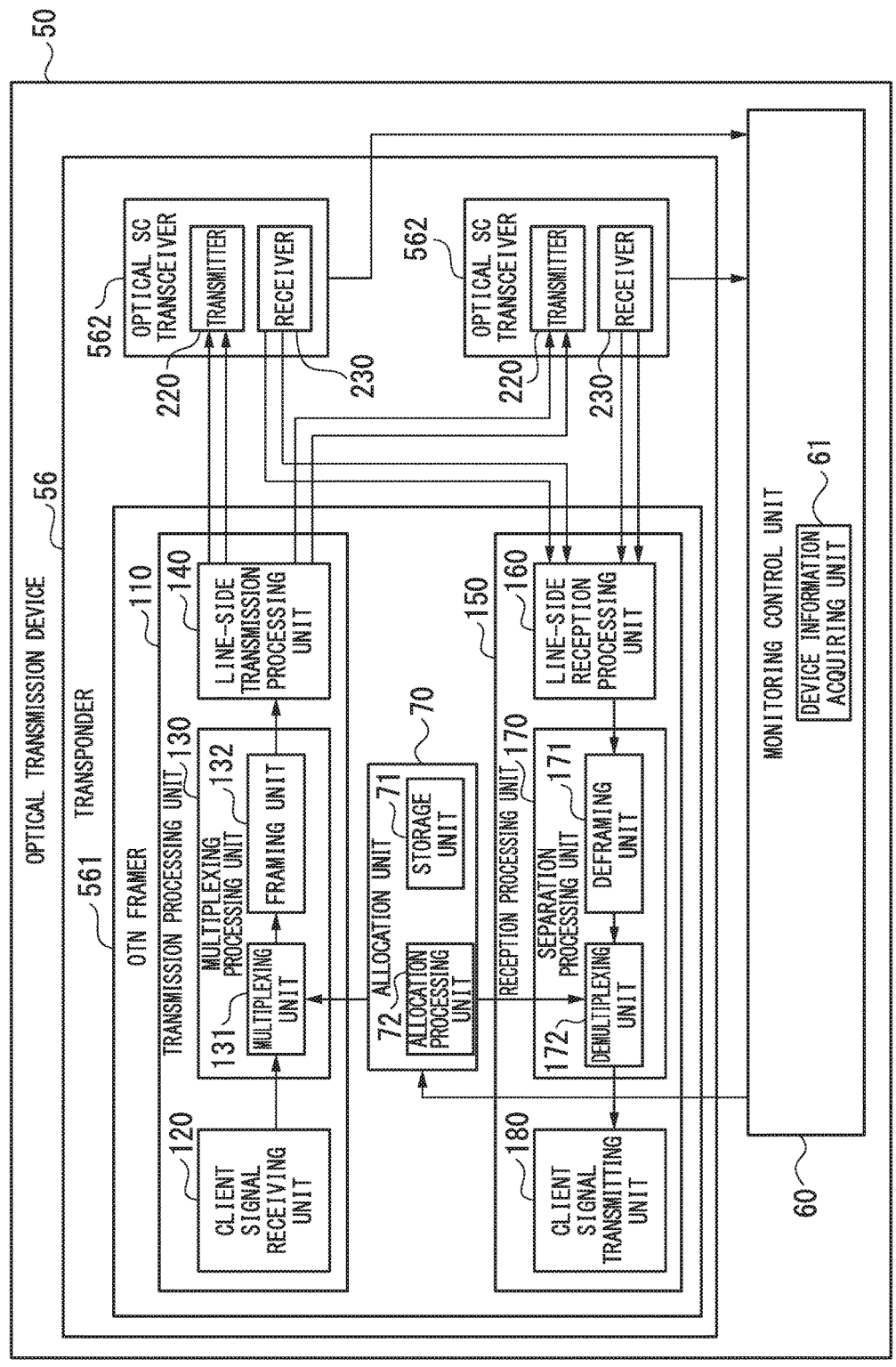
FIG. 9 is a functional block diagram showing an example of a configuration of a transponder.

FIG. 9 is a functional block diagram showing a detailed configuration of the transponder 56 of the optical transmission device 50 according to this embodiment. In the drawing, the same elements as in the OTN framer 800 shown in FIG. 1 and the optical transmission device 50 shown in FIG. 5 will be referenced by the same reference numerals and a description thereof will not be repeated.

The transponder 56 having a configuration for realizing OTUCn includes k optical SC transceivers 562 (where n≥k and k is an integer). In the drawing, the case of k=2 will be shown as an example.

Each optical SC transceiver 562 includes a transmitter 220 and a receiver 230. The OTN framer 561 of the transponder 56 includes an allocation unit 70, a transmission processing unit 110, and a reception processing unit 150.

The function of the allocation unit 70 of the OTN framer 561 is the same as that of the allocation unit 70 of the OTN framer 541 of the NNI card 54 shown in FIG. 8. Here, the allocation unit 70 of the transponder 56 receives information on the signal rate or the number of optical subcarriers of the optical SC transceiver 562 from the device information acquiring unit 61. The allocation processing unit 72 determines to which optical subcarrier (or which optical SC transceiver 562) TSs of ODUCn correspond on the basis of information on the signal rate or the number of optical subcarriers of the optical SC transceiver 562 received from the device information acquiring unit 61, generates the time slot information, and writes the generated time slot information to the storage unit 71.

The device information acquiring unit 61 may be provided in common for a plurality of NNI cards 54 or transponders 56 of the optical transmission device 50 or may be provided for each NNI card 54 or each transponder 56. The monitoring control unit 60 may be configured to include the allocation unit 70.

Figure 10:
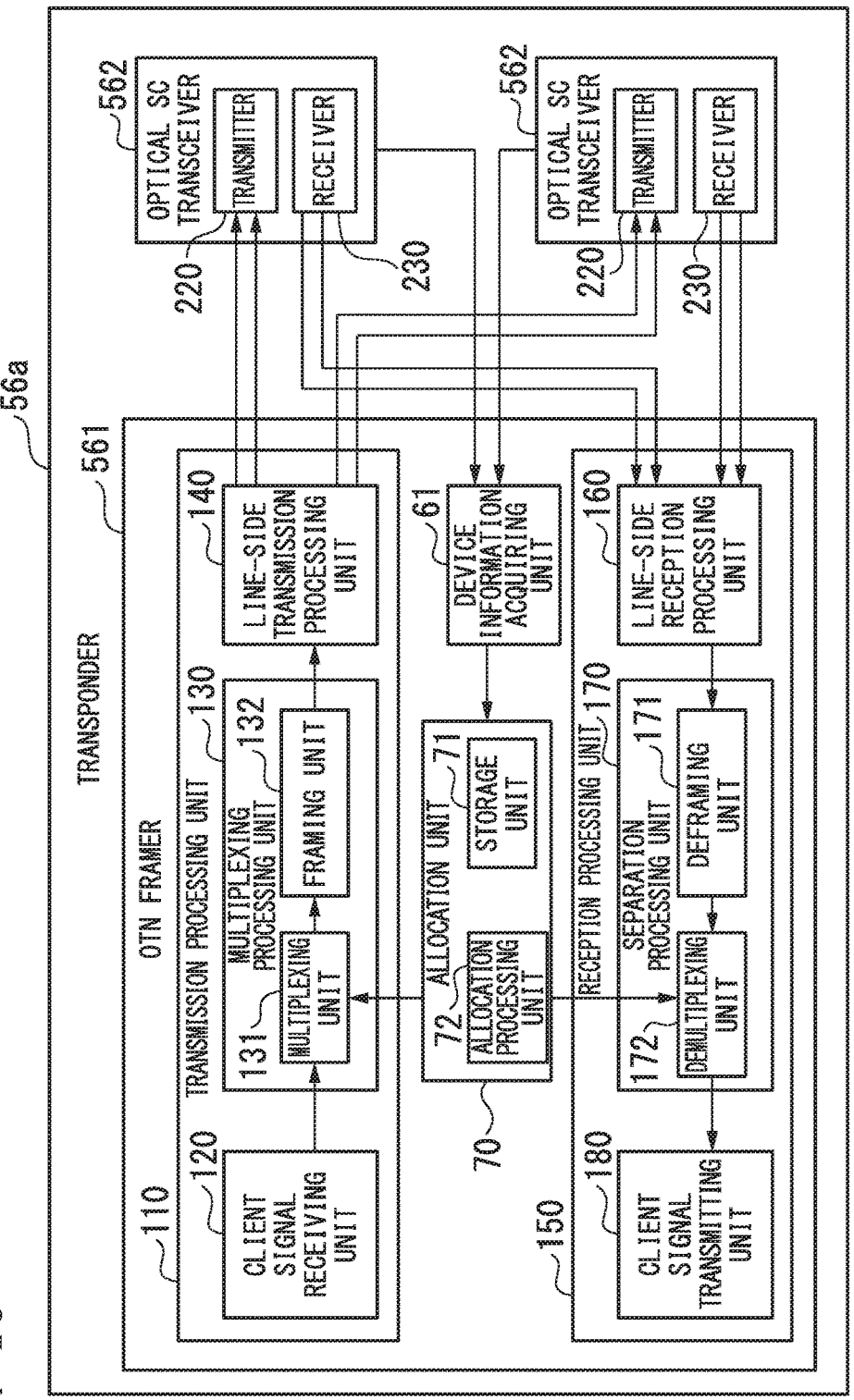
FIG. 10 is a functional block diagram showing another example of the configuration of the transponder.

FIG. 10 is a functional block diagram showing a configuration of a transponder 56a as a modified example. The optical transmission device 50 may include the transponder 56a shown in the drawing instead of the transponder 56. The transponder 56a includes the device information acquiring unit 61 provided in the OTN framer 561.

The OTN framer 541 of the NNI card 54 may be configured to include the device information acquiring unit 61 similarly to the transponder 56a. In this case, the device information acquiring unit 61 included in the NNI card 54 receives the information on the signal rate or the number of optical subcarriers from the optical SC transceiver 542 included in the NNI card 54.

Figure 11:
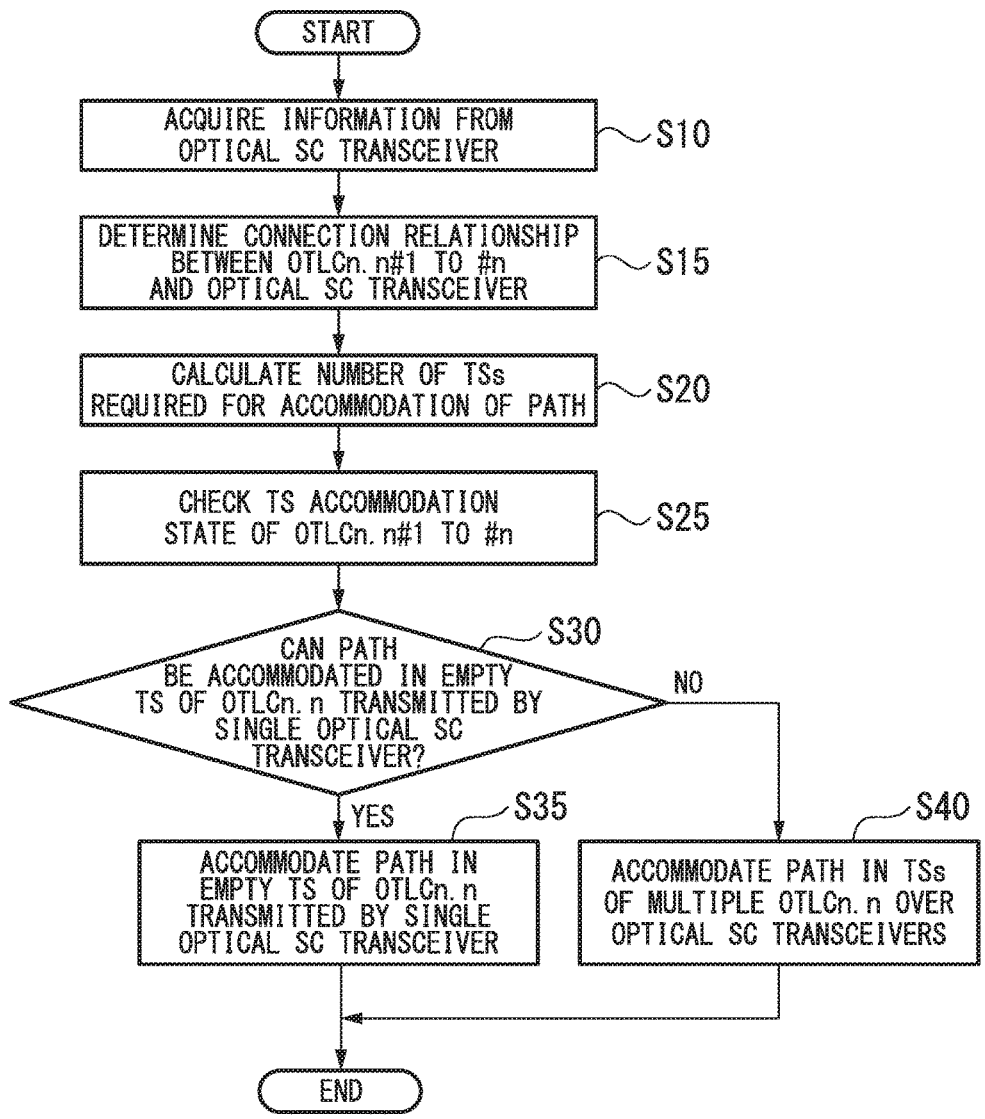
FIG. 11 is a flowchart showing a TS allocating process of the optical transmission device.

FIG. 11 is a flowchart showing a TS allocating process in the optical transmission device 50. Hereinafter, a case in which TSs are allocated to a path to be accommodated in the NNI card 54 will be described as an example.

First, information on the NNI card 54 which is a path accommodation destination and information on a band of a path of a client signal to be accommodated are input to the optical transmission device 50 by an operator.

The device information acquiring unit 61 acquires the information on the signal rate or the number of optical subcarriers of the optical SC transceiver 542 included in the NNI card 54 as the path accommodation destination and notifies the acquired information to the allocation unit 70 of the NNI card 54 that is the path accommodation destination (Step S10).

The number of optical subcarriers to be notified may be the number of optical subcarriers which are currently used by each optical SC transceiver 542 under operation included in the NNI card 54 as the path accommodation destination, or may be the total number of optical subcarriers which are currently used by all the optical SC transceivers 542 under operation.

When the optical SC transceivers 542 use one modulation scheme and the signal rate is not variable, the total number of optical subcarriers may be acquired from the number of optical SC transceivers 542 included in the NNI card 54.

Then, the allocation processing unit 72 determines a connection relationship between OTLCn.n#1 to OTLCn.n#n and the optical SC transceivers 542 on the basis of the information received from the device information acquiring unit 61 (Step S15).

For example, it is assumed that two optical SC transceivers 542 in the NNI card 54 having the configuration for realizing OTUC4 are operating and the information received from the device information acquiring unit 61 indicates that the signal rate of each optical SC transceiver 542 is 200 G and the total number of optical subcarriers is two. In this case, the allocation processing unit 72 determines that the first optical SC transceiver 542-1 corresponds to OTLC4.4#1 and OTLC4.4#2 and the second optical SC transceiver 542-2 corresponds to OTLC4.4#3 and OTLC4.4#4. The allocation processing unit 72 generates the time slot information on the basis of the determined connection relationship and stores the generated time slot information in the storage unit 71.

Then, the allocation processing unit 72 calculates the number of TSs which it is necessary to allocate to the path to be accommodated from the information of the band of the path input by the operator's operation (Step S20). Then, the allocation processing unit 72 checks a TS accommodation state on the basis of the path accommodation information stored in the storage unit 71 and determines empty TSs of ODUCn (Step S25). That is, the allocation processing unit 72 acquires empty TSs which are not allocated to any path and the number of empty TSs in the areas of OTLCn.n corresponding to the optical SC transceivers 542 included in the NNI card 54 as the path accommodation destination.

In the above-mentioned example, the allocation processing unit 72 determines empty TSs in the area of OTLC4.4#1 and empty TSs in OTLC4.4#2 and acquires the number of empty TSs corresponding to the optical SC transceiver 542-1 by totaling the numbers of empty TSs thereof. Similarly, the allocation processing unit 72 determines empty TSs in the area of OTLC4.4#3 and empty TSs in OTLC4.4#4 and acquires the number of empty TSs corresponding to the optical SC transceiver 542-2 by totaling the numbers of empty TSs thereof.

The allocation processing unit 72 determines whether a path can be accommodated in the area of OTLCn.n which is transmitted by one optical SC transceiver 542 (Step S30). Accordingly, the allocation processing unit 72 determines whether there is an optical SC transceiver 542 in which the number of empty TSs is equal to or greater than the number of TSs which it is necessary to allocate and which is calculated in Step S20.

When it is determined that there is an optical SC transceiver 542 in which the number of empty TSs is equal to or greater than the number of TSs which it is necessary to allocate (YES in Step S30), the allocation processing unit 72 accommodates the path to be accommodated in the empty TSs in the area of OTLCn.n corresponding to the optical SC transceiver 542 (Step S35). Then, the allocation processing unit 72 adds information in which identification information of the path and a TS number to be allocated to the path are correlated to the path accommodation information stored in the storage unit 71.

On the other hand, when it is determined that there is no optical SC transceiver 542 in which the number of empty TSs is equal to or greater than the number of TSs which it is necessary to allocate (NO in Step S30), the allocation processing unit 72 accommodates the path to be accommodated in the empty TSs in the area of OTLCn.n over a plurality of optical SC transceivers 542 (Step S40).

At this time, the allocation processing unit 72 allocates the TSs such that the number of optical SC transceivers 542 corresponding to OTLCn.n including the TSs to which the path to be accommodated is allocated, that is, the number of optical subcarriers for transmitting the TSs to which the path to be accommodated is allocated, is minimized. Then, the allocation processing unit 72 adds information in which identification information of the path to be accommodated and TS numbers in which the path is accommodated are correlated to the path accommodation information stored in the storage unit 71.

As in the above-mentioned example (FIGS. 7A to 7D), it is assumed at there is a connection relationship that the first optical SC transceiver 542-1 corresponds to OTLC4.4#1 and OTLC4.4#2 and the second optical SC transceiver 542-2 corresponds to OTLC4.4#3 and OTLC4.4#4.

In a case in which the band of the path to be accommodated is 200 G (see Client C in FIG. 7B), the allocation processing unit 72 determines that the determination result of Step S30 is YES when at least one of a condition that all the TSs in the area of OTLC4.4#1 and the area of OTLC4.4#2 be empty and a condition that all the TSs in the area of OTLC4.4#3 and the area of OTLC4.4#4 be empty is satisfied. The allocation processing unit 72 allocates the empty TSs corresponding to 200 G in the area of OTLC4.4#1 and OTLC4.4#2 or the empty TSs corresponding to 200 G in the area of OTLC4.4#3 and the area of OTLC4.4#4 to the path to be accommodated.

On the other hand, when there is a TS allocated to another path in the combined area of the area of OTLC4.4#1 and the area of OTLC4.4#2 and there is a TS allocated to another path in the combined area of the area of OTLC4.4#3 and the area of OTLC4.4#4, the allocation processing unit 72 determines that the determination result of Step S30 is NO because there is no empty TS corresponding to 200 G in any area of OTLCn.n which is transmitted by any optical SC transceiver 542. The allocation processing unit 72 allocates empty TSs corresponding to 200 G over the areas of OTLC4.4#1 and OTLC4.4#2 and the areas of OTLC4.4#3 and OTLC4.4#4 to the path to be accommodated.

It is assumed that the connection relationship is the same as in the above-mentioned example and the band of the path to be accommodated is 100 G. Then, when empty TSs corresponding to 100 G or more are present in at least one of the combined area of the area of OTLC4.4#1 and the area of OTLC4.4#2 and the combined area of the area of OTLC4.4#3 and the area of OTLC4.4#4, the allocation processing unit 72 determines that the determination result of Step S30 is YES.

The allocation processing unit 72 allocates empty TSs corresponding to 100 G in the combined area of the area of OTLC4.4#1 and the area of OTLC4.4#2 or empty TSs corresponding to 100 G in the combined area of the area of OTLC4.4#3 and the area of OTLC4.4#4 to the path to be accommodated.

On the other hand, when there is no empty TS corresponding to 100 G in at least one of the combined area of the area of OTLC4.4#1 and the area of OTLC4.4#2 and the combined area of the area of OTLC4.4#3 and the area of OTLC4.4#4, the allocation processing unit 72 determines that the determination result of Step S30 is NO. The allocation processing unit 72 allocates empty TSs corresponding to 100 G over the areas of OTLC4.4#1 and OTLC4.4#2 and the areas of OTLC4.4#3 and OTLC4.4#4 to the path to be accommodated.

It is assumed that the NNI card 54 having the configuration for realizing OTN4 includes four optical SC transceivers 542-1 to 542-4 transmitting parallel signals by optical subcarriers of 100 G.

The allocation processing unit 72 receives information indicating that the signal rate of each optical SC transceiver 542 is 100 G and the total number of optical subcarriers is 4 from the device information acquiring unit 61 and determines that the optical SC transceiver 542-*i* corresponds to OTLC4.4#*i*.

It is assumed that empty TSs in the area of OTLC4.4#1 correspond to 20 G, empty TSs in the area of OTLC4.4#2 correspond to 30 G, empty TSs in the area of OTLC4.4#3 correspond to 50 G, empty TSs in the area of OTLC4.4#4 correspond to 100 G, and the path to be accommodated corresponds to 150 G.

In this case, the path to be accommodated cannot be allocated to the TSs in the area of OTLC4.4 corresponding to one optical SC transceiver 542. Therefore, the allocation processing unit 72 allocates the path to be accommodated to empty TSs corresponding to 50 G in the area of OTLC4.4#3 and empty TSs corresponding to 100 G in the area of OTLC4.4#4 to decrease the number of optical subcarriers to be used.

When there are a plurality of patterns in which the path to be accommodated can be allocated to minimize the number of optical subcarriers to be used, the allocation processing unit 72 allocates the path to be accommodated to the area of OTLC4.4 in which the number of empty TSs is the smallest among the patterns.

For example, it is assumed that the optical SC transceiver 542-*i* corresponds to OTLC4.4#*i*, empty TSs in the area of OTLC4.4#1 correspond to 150 G, empty TSs in the area of OTLC4.4#2 correspond to 100 G empty TSs in the area of OTLC4.4#3 correspond to 80 G, empty TSs in the area of OTLC4.4#4 correspond to 50 G, and the path to be accommodated corresponds to 50 G.

In this case, even when the path to be accommodated is accommodated in any of OTLC4.4#1 to OTLC4.4#4, the path can be accommodated in the area of OTLCn.n transmitted by one optical SC transceiver 542, but the allocation processing unit 72 accommodates the path to be accommodated in the area of OTLC4.4#4 having the smallest number of empty TSs. Accordingly, the maximum number of empty TSs in one area of OTLC4.4 is kept as large as possible such that a path to be accommodated later is not distributed to a plurality of areas of OTLC4.4.

The multiplexing unit 131 maps TSs of the LO ODU in which a client signal is set on TSs of ODUCn on the basis of the correspondence between the path of the client signal and the TS which is indicated by the path accommodation information stored in the storage unit 71. The demultiplexing unit 172 extracts the LO ODU from the TSs of ODUCn on the basis of the path accommodation information stored in the storage unit 71.

The device information acquiring, unit 61 may notify an opposite optical transmission device 50 of the updated path accommodation information. In this case, in the opposite optical transmission device 50, the demultiplexing unit 172 extracts the LO ODU from the TSs of ODUCn on the basis of the received path accommodation information and the multiplexing unit 131 maps the TSs of the LO ODU on the TSs of ODUCn on the basis of the received path accommodation information.

The OTN framer 541 may set the updated path accommodation information in an empty area of OH of OTLCn.n and transmit the updated path accommodation information to the opposite optical transmission device 50.

The optical transmission device 50 may perform the process of Step S10, for example, when the NNI card 54 is installed, when the optical SC transceiver 542 is installed in the NNI card 54, when the installation state of the optical SC transceiver 542 is changed, or the like. Information on which optical SC transceiver 542 each TS in ODUCn corresponds to may be input in advance by an operator's operation. In this case, the processes of Steps S10 and S15 may be skipped.

An example in which the NNI card 54 is a path accommodation destination has been described above, but the same is true when the transponder 56 is a path accommodation destination.

An example in which the band of one optical channel is n×100 G and the band of a parallel signal is 100 G has been described in this embodiment, but the band of one optical channel or the band of a parallel signal can be set arbitrarily as described above.

According to the above-mentioned embodiment, the OTN framer allocates TSs to a path of a client signal such that the number of optical subcarriers in which the path is accommodated is minimized on the basis of the information on the signal rate or the number of optical subcarriers of the optical SC transceiver disposed in the stage subsequent thereto. Accordingly, it is possible to minimize an influence range of path malfunction when some optical subcarriers malfunction in multicarrier transmission of an optical channel.

The functions of the monitoring control unit 60 and the allocation unit 70 in the above-mentioned embodiment may be embodied by a computer. In this case, the functions may be embodied by recording a program for realizing the functions on a computer-readable recording medium and causing the computer system to read and execute the program recorded on the recording medium. The "computer system" mentioned herein includes an operating system (OS) or hardware such as peripherals.

Examples of the "computer-readable recording medium" include a portable medium such as a flexible disk, a magneto-optical disc, a ROM, or a CD-ROM and a storage device such as a hard disk built in the computer system. The "computer-readable recording medium" may include a medium that dynamically holds a program for a short time like a communication line when a program is transmitted via a network such as the Internet or a communication line such as a telephone circuit and a medium that holds a program for a predetermined time like a volatile memory in a computer system serving as a server or a client in that case.

The program may serve to realize some of the above-mentioned functions, or may serve to realize the above-mentioned functions in combination with another program stored in advance in the computer system.

While embodiments of the present invention have been described above in detail with reference to the drawings, the specific configuration thereof is not limited to the above-mentioned embodiments, but includes designs and the like without departing from the gist of the present invention.

INDUSTRIAL APPLICABILITY

The present invention can be applied to large-capacity optical transmission.

REFERENCE SIGNS LIST

50 Optical transmission device
51 ODU cross-connection functional unit
52 UNI card
53 ODU-XC
54 NNI card
55 Optical transmission functional unit
56, 56a Transponder
57 Multiplexer-demultiplexer
60 Monitoring control unit
61 Device information acquiring unit
70 Allocation unit
71 Storage unit
72 Allocation processing unit
110 Transmission processing unit
120 Client signal receiving unit
121 Reception unit
122 Mapping unit
123 OH processing unit
130 Multiplexing processing unit
131 Multiplexing unit
132 Framing unit
140 Line-side transmission processing unit transmission signal generating unit)
141 Interleaving unit
142-1, 142-2, 142-3, 142-4 OH processing unit
143-1, 143-2, 143-3, 143-4 Multi-lane transmission unit
150 Reception processing unit
160 Line-side reception processing unit
161-1, 161-2, 161-3, 161-4 Multi-lane reception unit
162-1, 162-2, 162-3, 162-4 OH processing unit
163 Deinterleaving unit
170 Separation processing unit
171 Deframing unit
172 Demultiplexing unit
180 Client signal transmitting unit
181 OH processing unit
182 Demapping unit
183 Transmission unit
210 ODU-SW
220 Transmitter
230 Receiver
521 OTN framer
541 OTN framer
542, 542-1, 542-2 Optical SC transceiver
561 OTN framer
562 Optical SC transceiver
800 OTN framer

The invention claimed is:

1. A framer which is connected to a plurality of transmitters that multicarrier-transmit a plurality of parallel signals by optical subcarriers, the framer comprising:

a storage unit configured to store time slot information indicating a correspondence between time slots in a signal frame and the optical subcarriers which are used to transmit parallel signals including data set in the time slots and path accommodation information indicating a correspondence between paths allocated to a client signal and the time slots in the signal frame;

an allocation processing unit configured to select, on the basis of empty time slots which are not allocated to any path indicated by the path accommodation information and the optical subcarriers corresponding to the empty time slots indicated by the time slot information, time slots to be allocated to a path to be accommodated from empty time slots such that the number of optical subcarriers corresponding to the time slots allocated to the path to be accommodated satisfies a predetermined condition and to set a correspondence between the path to be accommodated and the selected time slots as the path accommodation information;

a multiplexing unit configured to set one or more received client signals to the time slots in the signal frame on the basis of the correspondence between the paths of the client signal and the tune slots which is indicated by the path accommodation information; and a transmission signal generating unit configured to divide the signal frame to which the client signal is set by the multiplexing unit to generate a plurality of parallel signals and to output the plurality of parallel signals to the plurality of transmitters that transmit the plurality of parallel signals using the optical subcarriers corresponding to the plurality of parallel signals.

2. The framer according to claim 1, wherein the predetermined condition is a condition that the number of optical subcarriers corresponding to the time slots allocated to the path to be accommodated be minimized.

3. The framer according to claim 1, further comprising a device information acquiring unit configured to acquire information on a signal rate of the plurality of transmitters and the number of optical subcarriers,
wherein the allocation processing unit determines, on the basis of the information acquired by the device information acquiring unit, the correspondence between the time slots and the optical subcarriers to generate the time slot information.

4. An optical transmission device including a framer that generates a plurality of parallel signals and a plurality of transmitters that multi-carrier transmit the plurality of parallel signals generated by the framer using optical subcarriers, the optical transmission device comprising:
a storage unit configured to store time slot information indicating a correspondence between time slots in a signal frame and the optical subcarriers which are used to transmit parallel signals including data set in the time slots and path accommodation information indicating a correspondence between paths allocated to a client signal and the time slots in the signal frame; and
an allocation processing unit configured to select, on the basis of empty time slots which are not allocated to any path indicated by the path accommodation information and the optical subcarriers corresponding to the empty time slots indicated by the time slot information, time slots to be allocated to a path to be accommodated from empty time slots such that the number of optical subcarriers corresponding to the time slots allocated to the path to be accommodated satisfies a predetermined condition and to set a correspondence between the path to be accommodated and the selected time slots as the path accommodation information,
wherein the framer includes at least
a multiplexing unit configured to set one or more received client signals to the time slots in the signal frame on the basis of the correspondence between the paths of the client signal and the time slots which is indicated by the path accommodation information, and
a transmission signal generating unit configured to divide the signal frame to which the client signal is set by the multiplexing unit to generate a plurality of parallel signals and to output the plurality of parallel signals to the plurality of transmitters that transmit the plurality of parallel signals using the optical subcarriers corresponding to the plurality of parallel signals.

5. A framing method which is performed by a framer which is connected to a plurality of transmitters that multi-carrier-transmit a plurality of parallel signals by optical subcarriers, the framer including a storage unit configured to store time slot information indicating a correspondence between time slots in a signal frame and the optical subcarriers which are used to transmit parallel signals including data set in the time slots and path accommodation information indicating a correspondence between paths allocated to a client signal and the time slots in the signal frame, the framing method comprising:
an allocation processing step of causing the framer to select, on the basis of empty time slots which are not allocated to any path indicated by the path accommodation information and the optical subcarriers corresponding to the empty time slots indicated by the time slot information, time slots to be allocated to a path to be accommodated from empty time slots such that the number of optical subcarriers corresponding to the time slot allocated to the path to be accommodated satisfies a predetermined condition and to set a correspondence between the path to be accommodated and the selected time slots as the path accommodation information;
a multiplexing step of causing the framer to set one or more received client signals to the time slots in the signal frame on the basis of the correspondence between the paths of the client signal and the time slots which is indicated by the path accommodation information; and
a transmission signal generating step of causing the framer to divide the signal frame to which the client signal is set in the multiplexing step to generate a plurality of parallel signals and to output the plurality of parallel signals to the plurality of transmitters that transmit the plurality of parallel signals using the optical subcarriers corresponding to the plurality of parallel signals.

* * * * *